United States Patent [19]

Sasaki et al.

[11] Patent Number: 4,645,029

[45] Date of Patent: Feb. 24, 1987

[54] FOUR-WHEEL VEHICLE DRIVE SYSTEM

[75] Inventors: Kan Sasaki, Aichi; Keisuke Takimura, Toyota; Nobuaki Katayama, Toyota; Fumitomo Tsuchiya, Toyota, all of Japan

[73] Assignee: Toyota Jidosha Kabushiki Kaisha, Aichi, Japan

[21] Appl. No.: 795,862

[22] Filed: Nov. 5, 1985

[51] Int. Cl.[4] ............................................. B60K 17/34
[52] U.S. Cl. .................................... 180/249; 74/701; 74/713
[58] Field of Search .................. 74/701, 713; 180/247, 180/249, 250

[56] References Cited

U.S. PATENT DOCUMENTS

| 4,476,952 | 10/1984 | Suzuki | 180/247 |
| 4,476,953 | 10/1984 | Hiraiwa | 180/249 |
| 4,582,160 | 4/1986 | Weismann et al. | 180/250 |

FOREIGN PATENT DOCUMENTS

| EP43806 | 1/1982 | European Pat. Off. | 180/249 |
| 0149302 | 1/1985 | European Pat. Off. | |
| 0175674 | 3/1986 | European Pat. Off. | |
| 3431717 | 10/1985 | Fed. Rep. of Germany | |
| 60-116528 | 6/1985 | Japan | |
| 2074516 | 11/1981 | United Kingdom | 180/249 |

Primary Examiner—Allan D. Herrmann
Attorney, Agent, or Firm—Parkhurst & Oliff

[57] ABSTRACT

The present invention relates to a transaxle mechanism for use in a four-wheel drive system of an automotive vehicle. The four-wheel vehicle drive system includes a central differential gear assembly, a front-wheel differential gear assembly, a ring gear and a bevel gear. The central differential gear assembly includes: a toothed wheel which engages with a transmission output gear of a power transmission gear unit; a central differential case fixed to the toothed wheel; a central pinion cross shaft fixed to the central differential case; central differential bevel pinions mounted rotatably on the central pinion cross shaft and central side bevel gears engaging with the central differential bevel pinion. The front-wheel differential gear assembly include; a front-wheel differential case fixed to one of the central side bevel gears; a front-wheel pinion cross shaft fixed to the front-wheel differential case; front-wheel differential bevel pinions mounted rotatably on the front wheel pinion cross shaft; front-wheel side bevel gears engaging with the front wheel differential bevel pinions and being secured to front wheel shafts. A second of the central side bevel gear has a hollow shaft portion within which one of the front shafts is inserted and a hub case is fixed to the hollow shaft portion of the second of central side bevel gear. The ring gear fixed to the hub case and the ring gear engages with the bevel gear which is connected to a propeller shaft. The ring gear is located apart from the central differential gear assembly and is located adjacent to the central longitudinal line of the vehicle.

21 Claims, 9 Drawing Figures

FOUR-WHEEL VEHICLE DRIVE SYSTEM

BACKGROUND OF THE INVENTION

The present invention relates to a four-wheel drive system for an automotive vehicle having at least a front and a rear pair of road wheels. More particularly, the present invention relates to improvements in a transaxle mechanism for use in a four-wheel drive system of an automotive vehicle.

A transaxle mechanism is disclosed in European Pat. No. 0043 806. This patent discloses a motor vehicle having a transmission system which includes a toothed wheel, an epicyclic gear train, a spider, front shafts, a bevel gear, a bevel pinion and a rear differential. The toothed wheel is driven by a gear carried by a secondary shaft of a gear box and then the toothed wheel drives the epicyclic gear train. The spider is driven by the epicyclic gear train and then the spider drives the front shafts.

The bevel gear is fixed to a planet carrier of the epicyclic gear train and the bevel pinion is meshed with the bevel gear. When the planet carrier is driven by the toothed wheel, the bevel pinion is driven by the bevel gear and then the rear differential is driven.

The transmission system can transmit driving torque to the front wheels through the toothed wheel, the epicyclic gear train, the spider and the front shafts, and can transmit driving torque to rear wheels through the toothed wheel, the epicyclic gear train, the bevel gear, the bevel pinion, the rear differential and rear shafts.

As shown in FIG. 1 of European Pat. No. 0043 806, a propeller shaft of the transmission system extends from an adjacent portion of an end of an engine. When the transmission system is mounted on the vehicle body, the propeller shaft may be located at one side of the vehicle body to balance the weight of the vehicle. This often results in the propeller shaft being located under passengers' seats, thus, creating problems in the arrangement of the passenger compartment. Further, as shown in FIG. 2 of European Pat. No. 0043 806, the toothed wheel is supported on a casing by a first roller bearing and the planet carrier is supported on the casing by a second roller bearing. However, there is no support means between the toothed wheel and the planet carrier. Accordingly, the toothed wheel and the planet carrier are not securely supported in the longitudinal direction of the front shafts and as a result, the toothed wheel is not securely engaged to the epicyclic gear train.

A second transaxle mechanism is disclosed in U.S. Pat. No. 4,476,953. This patent discloses a four wheel vehicle drive system including a transmission output gear, a central differential gear assembly, a first intermediate gear which is fixed to a side bevel gear of the central differential gear assembly, an intermediate gear shaft, a bevel gear which is fixed to the intermediate gear shaft, a driven bevel gear which is connected to a propeller shaft, a rear differential gear assembly, a front-wheel differential gear assembly and front shafts.

The central differential gear assembly is driven by the transmission output gear and the side bevel gear of the central differential gear assembly drives the first intermediate gear. The intermediate gear shaft is driven by the first intermediate gear and the bevel gear drives the driven bevel gear. The rear differential gear assembly is driven by the propeller shaft. Further, the side bevel gear of the central differential gear assembly drives the front-wheel differential gear assembly which drives the front shafts.

Therefore, the four-wheel vehicle drive system can transmit driving torque to front wheels through the transmission output gear, the central differential gear assembly and the front shafts, while the four-wheel vehicle drive system can transmit driving torque to rear wheels through the transmission output gear, the central differential gear assembly, the first intermediate gear, the intermediate gear shaft, the bevel gear, the driven bevel gear, the propeller shaft, the rear differential gear assembly and rear shafts.

Further, in the four-wheel vehicle drive system, the first intermediate gear is located apart from the central differential gear assembly and is located adjacent to the center portion of the vehicle in the lateral direction of the vehicle.

However, the front differential gear assembly of U.S. Pat. No. 4,476,953 is located apart from the central differential gear assembly, and, as a result, a hollow shaft is required. Accordingly, the weight and size of the four-wheel vehicle drive system is increased.

SUMMARY OF THE INVENTION

The present invention was developed in view of the foregoing background and to overcome the foregoing drawbacks. It is accordingly an object of this invention to provide a four-wheel vehicle drive system which is lighter, and whose transmitting shaft extends along a central longitudinal line of a vehicle. The four-wheel vehicle drive system includes a central differential gear assembly, a front-wheel differential gear assembly, transmitting means and a rear differential gear assembly. The central differential gear assembly includes a toothed wheel which engages with a transmission output gear of a power transmission mechanism, a central differential input member fixed to the toothed wheel, and central differential output members mounted rotatably within the central differential input member with the rotation of the central differential input member being transmitted to the central differential output members. The front-wheel differential gear assembly includes a front-wheel differential input member fixed to one of the central differential output members, front-wheel differential output members mounted rotatably within the front wheel differential input member, the rotation of the front-wheel differential input member being transmitted to the front wheel differential output members and front wheel shafts. A second of the central differential output members includes a cylindrical portion within which one of the front shafts is inserted. The transmitting means includes a transmitting input member, right-angle power transfer means and a transmitting output member. The transmitting input member is fixed to the cylindrical portion of the second of central differential output members. The transmitting torque is transmitted from the central differential gear assembly to the rear differential gear assembly through the transmitting means.

Further, the front-wheel differential gear assembly is enclosed within the central differential input member and the transmitting input member is located apart from the central differential gear assembly and is located adjacent to the central longitudinal line of the vehicle.

Accordingly, the four-wheel vehicle drive system does not require another hollow shaft and the transmitting shaft connected to the transmitting output member extending along the longitudinal central line of the vehicle.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements.

DETAILED DESCRIPTION OF THE PREFERRED EMBODIMENTS

The present invention will be described in detail with reference to the accompanying drawings which illustrate different embodiments according to the present invention.

Figure 1:
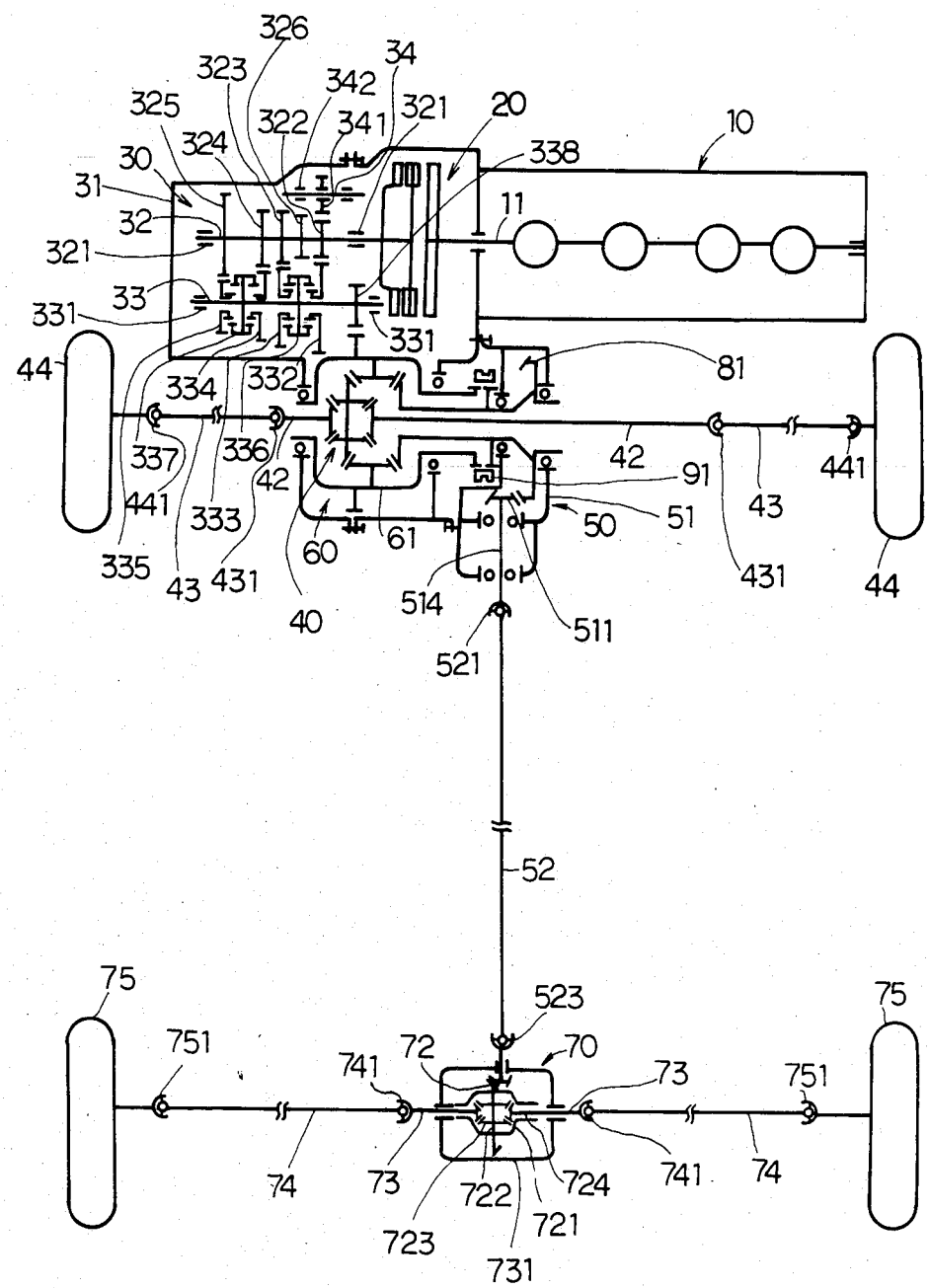
FIG. 1 is a schematic plan view showing a preferred embodiment of a four-wheel drive system according to the present invention.

Referring to FIG. 1, an internal combustion engine 10 is mounted on a front-right portion of a vehicle body (not shown in drawings) and an output shaft 11 of the engine 10 extends in a lateral direction of the vehicle body. An end of the output shaft 11 is connected to a clutch unit 20 of a transaxle mechanism which includes a power transmission gear unit 30, a front-wheel drive gear unit 40 and a transmitting means 50. The clutch unit 20 is of the friction-disc type and the power transmission gear unit 30 is of the manually operated synchromesh type.

The power transmission gear unit 30, which is enclosed within a main transaxle gear casing 31, includes input and output shafts 32 and 33. The input shaft 32 is mounted rotatably on the main transaxle gear casing 31 by bearings 321 and axially extends and is in alignment with the axis of rotation of the engine output shaft 11. The output shaft 33 is mounted rotatably on the main transaxle gear casing 31 by bearings 331 and axially extends in parallel with the input shaft 32. The input shaft 32 is selectively coupled to and uncoupled from the engine output shaft 11 through the clutch unit 20. The power transmission gear unit 30 is of a four-forward-speed and one-reverse-speed type and includes first-speed through fourth-speed drive gears 322 through 325 and a reverse drive gear 326. The output shaft 33 has four driven gears 332 through 335 which are coaxially rotatable independently of one another on the output shaft 33 and the four driven gears 332 through 335 mesh with the four drive gears 322 through 325. The power transmission gear unit 30 further includes a reverse idler shaft 34 having an idler gear 341 coaxially rotatable thereon and axially movable on the reverse idler shaft 34 into and out of an axial position to mesh with the reverse drive gear 326. The reverse idler shaft 34 extends in parallel with the input shaft 32 and is mounted rotatably on the main transaxle gear casing 31 by bearings 342.

The power transmission gear unit 30 further includes first-second and third-fourth speed synchronizer clutch assemblies 336 and 337, each of which is coaxially rotatable with the output shaft 33. The first-second speed synchronizer clutch assembly 336 is located between the first-speed and second-speed driven gears 332 and 33 and is selectively engageable with the first-speed or second-speed driven gears 332 or 333. The third-fourth speed synchronizer clutch assembly 337 is located between the third-speed and fourth-speed driven gears 334 and 335 and is selectively engageable with the third-speed or fourth-speed driven gears 334 or 335. A transmission output gear 338 is fixed on the output shaft 33.

Figure 2:
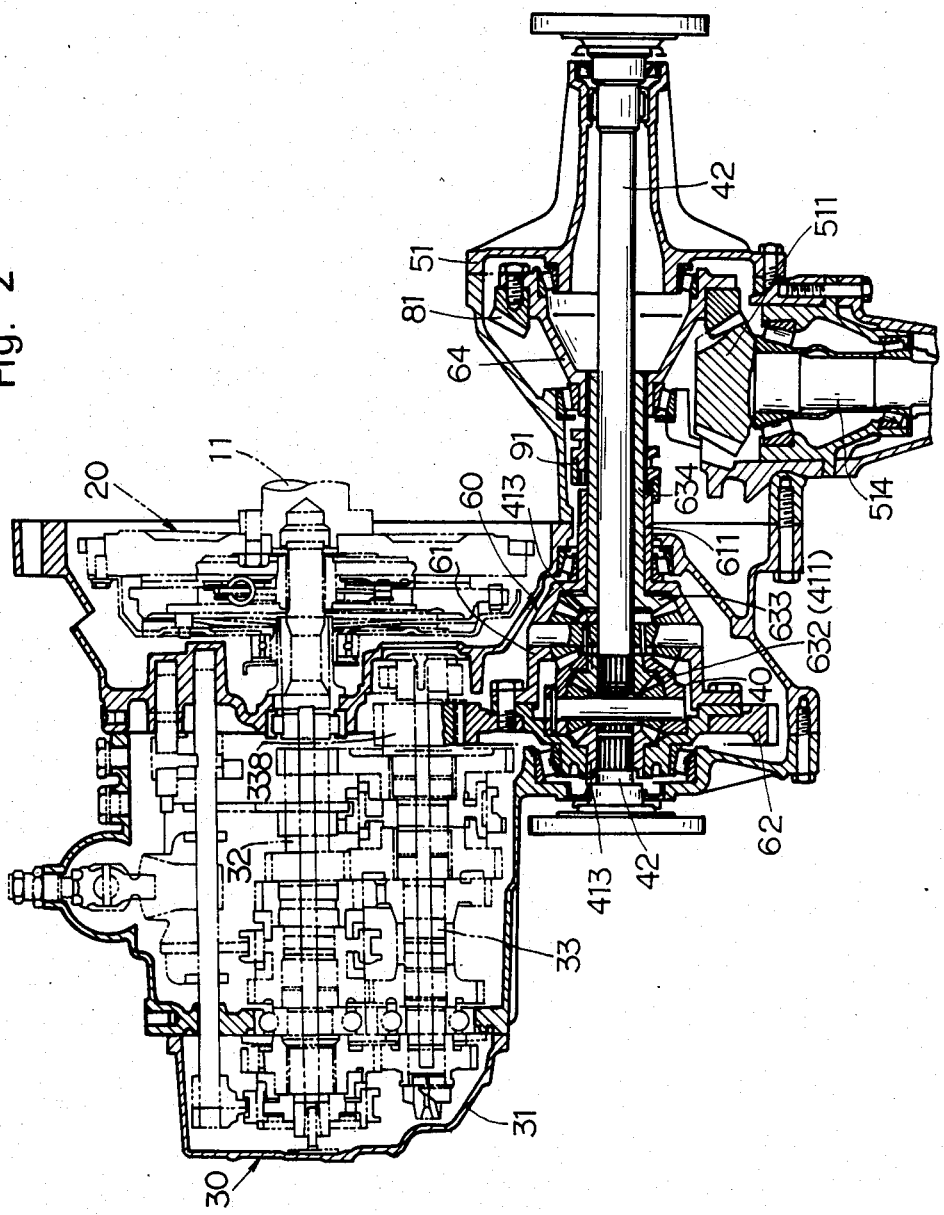
FIG. 2 is an enlarged sectional view of a transaxle mechanism of the four-wheel drive system shown in FIG. 1, which is adapted to a vehicle having a full time four-wheel drive system.
Figure 3:
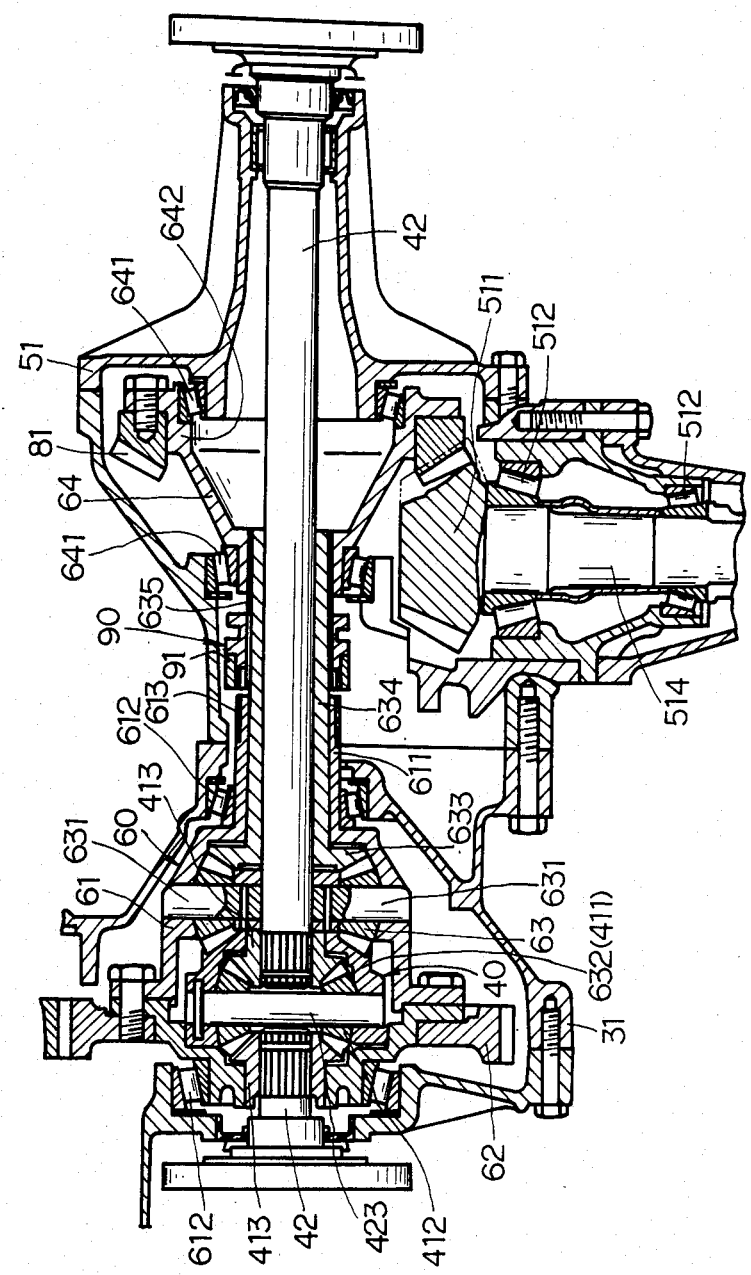
FIG. 3 is an enlarged sectional view of a front wheel drive gear unit and transmitting means of the transaxle mechanism of the four-wheel drive system shown in FIG. 2, wherein an annular coupling sleeve of a lock-up clutch is uncoupled from a central differential case.
Figure 4:
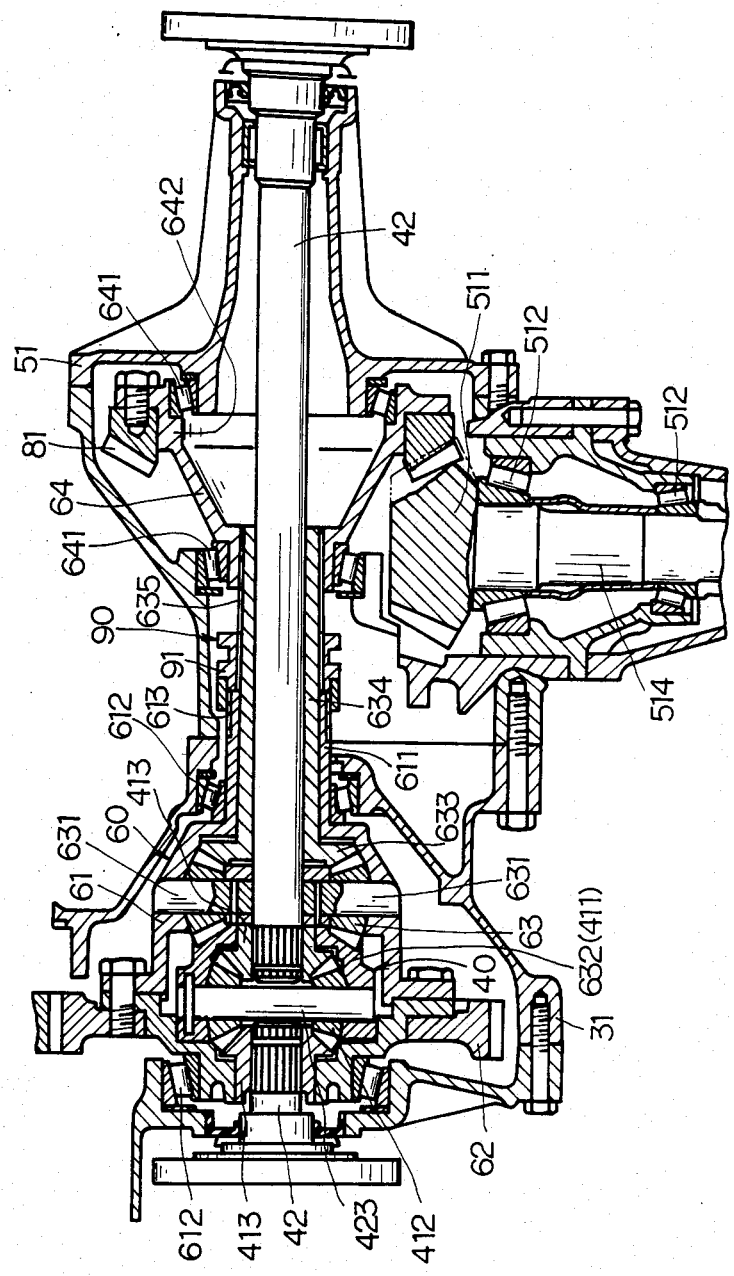
FIG. 4 is an enlarged sectional view of the front wheel drive gear unit and the transmitting means of the transaxle mechanism shown in FIG. 3, wherein the annular coupling sleeve is coupled to the central differential case.

The main transaxle gear casing 31 encloses a central differential gear assembly 60, the clutch unit 20 and the power transmission gear unit 30 and is securely connected to an auxiliary transaxle gear case 51. As shown in FIGS. 2 through 4, the central differential gear assembly 60 includes a central differential gear case 61 which is rotatable about an axis directed laterally of the vehicle body and which is parallel with the output shaft 33.

The central differential gear case 61 has a cylindrical boss portion 611 rotatably supported in the main transaxle gear casing 31 by bearings 612 and the central differential gear case 61 is coaxially secured by bolts to a toothed wheel 62 which engages with the transmission output gear 338 of the power transmission gear unit 30. The central differential gear case 61 serves as an input member of the central differential gear assembly 60 and includes a pair of central differential bevel pinions 63 which are rotatably mounted on central split pinion cross shafts 631, which are secured to the central differential gear case 61, and which axially extend in alignment with each other at right angles to the axis of rotation of the central differential gear case 61. The central differential bevel pinions 63 are rotatable not only together with the central differential gear case 61 and the central split pinion cross shafts 631 about the axis of rotation of the central differential gear case 61 but also, independently, about the central split pinion cross shafts 631. The central differential bevel pinions 63 are disposed between and engage with axially bored central side bevel gears 632 and 633 which serve as two output members of the central differential gear assembly 60. The central side bevel gears 632 and 633 are also carried in the central differential gear case 61 and are rotatable about the axis of rotation of the central differential gear case 61. One of the central side bevel gears 632 is integrally formed on a front wheel differential case 411 which is enclosed within the central differential gear case 61. The front wheel differential case 411 is rotatable with respect to the main transaxle gear casing 31 and the central differential gear case 61 about the axis of rotation of the central differential gear case 61.

A second of the side bevel gears 633 has a cylindrical boss portion 634 axially extending opposite to the one of side bevel gears 632, which is inserted within and extends through the boss portion 611 of the central differential gear case 61. An intermediate portion of the cylindrical boss portion 634 of the second side bevel gears 633 has external splines 635 and an end of the cylindrical boss portion 634 is fixed to a hub member 64 which is mounted on the auxiliary transaxle gear casing 51 by bearings 641. The hub member 64 has an outwardly expanded portion 642 and a ring gear 81 is fixed to the outwardly expanded portion 642 of the hub member 64. The hub member 64 serves as an input member of the transmitting means 50.

An annular coupling sleeve 91 of an engagement clutch 90 is mounted slidably along the external splines 635 which is formed on the intermediate portion of the cylindrical boss portion 634 of the second of central side bevel gears 633. The annular coupling sleeve 91 engages selectively with an external serrated portion 613 which is formed on the cylindrical boss portion 611 of the central differential gear case 61. The annular coupling sleeve 91 is formed with an external circumferential groove, in which a clutch actuating fork (not shown in drawings) is fitted. The clutch actuating fork is connected through a suitable mechanical linkage to manually or otherwise operated engagement control means (not shown in drawings) so that the annular coupling sleeve 91 is axially selectively moveable into or out of engagement with the external serrated portion 613 of the central differential gear case 61.

Accordingly, as shown in FIG. 3, when the annular coupling sleeve 91 is uncoupled from the cylindrical boss portion 611 of the central differential gear case 61, the cylindrical boss portion 634 of the central side bevel gear 633 is rotatable independently of the central differential gear case 61, while, as shown in FIG. 4, when the annular coupling sleeve 91 is coupled to the cylindrical boss portion 611 of the central differential gear case 61, the cylindrical boss portion 634 of the second of central side bevel gear 633 is rotatable together with the central differential gear case 61.

A front-wheel drive gear unit 40 of the four wheel drive system includes a pair of front shafts 42 which have axes of rotation aligned with the axis of rotation of the cylindrical boss portion 634 of the second of the central side bevel gear 633, and which is parallel with the input and output shaft 32 and 33 of the power transmission gear unit 30. One of the front shafts 42 has an intermediate portion extending through the cylindrical boss portion 634 of the second of central side bevel gear 633 and extending outwardly from the auxiliary transaxle gear casing 51. A second of the front shafts 42 extends opposite to the first front shaft 42 outwardly from the main transaxle gear casing 31. The front shafts 42 have externally serrated inner end portions and axially extended in opposite directions laterally of the vehicle body from the front wheel differential case 411 which is enclosed within the central differential case 61.

The front wheel differential case 411 is rotatable about an axis aligned with the axes of rotation of the front shafts 42, and the front wheel differential case 411 serves as an input member of the front wheel differential gear unit 40 and is rotatably supported in the central differential case 61. A portion of the front wheel differential case 411 is in contact with an inner surface of the central differential case 61 through an intervening member. A pair of front differential bevel pinions 412 are rotatably mounted on a front wheel common pinion cross shaft 423 which is secured to the front wheel differential case 411, and which extends at a right angle to the axis of rotation of the front wheel differential case 411. The individual front differential bevel pinions 412 are rotatable not only together with the front wheel differential case 411 and the front wheel common pinion cross shaft 423 about the axis of the rotation of the front wheel differential case 411 but also independently about the front wheel common pinion cross shaft 423. The front differential bevel pinions 412 are disposed between and mesh with a pair of front differential side bevel gears 413 which are rotatable about the axis of rotation of the front wheel differential case 411. Further, a part of the central differential case 61 and the front wheel differential case 411 enclose the pair of front differential side bevel gears 413, one of which is rotatably mounted on the front wheel differential case 411, another of which is rotatably mounted on the central differential case 61.

The front differential side bevel gears 413 serve as output members of the front differential gear unit 40 and are splined to the serrated inner end portions of the front shafts 42. The front shafts 42 are operatively connected respectively at their axially outer ends to front wheel drive shafts 43 through constant-velocity coupling devices 431. The front wheel drive shafts 43 extend in a lateral direction of the vehicle body and are connected at their outer axial ends using universal coupling devices 441 to front wheel axles for front road wheels 44.

As shown in FIG. 1, the auxiliary transaxle casing 51 encloses the ring gear 81, which transmits driving force from the cylindrical boss portion 634 of central side bevel gear 633 to a transmitting bevel gear 51. The ring gear 81 is coaxially rotatable with the hub member 64 and meshes with the transmitting bevel gear 511 which is rotatable about an axis perpendicular to the axis of rotation of the front shafts 42. Accordingly, the ring gear 81 and the transmitting bevel gear 511 serve as a right-angle power transfer means of the transmitting means 50. Further, the transmitting bevel gear 511 is positioned adjacent to a central portion of the vehicle body in the lateral direction of the vehicle body and has a rearward axial extension 514 which is mounted rotatably on the auxiliary transaxle gear casing 51 by bearings 512.

The rearward axial extension 514 of the transmitting bevel gear 511 projects rearwardly from the auxiliary transaxle gear casing 51 and is connected to a propeller shaft 52 through a constant-velocity coupling unit 521. The propeller shaft 52 extends rearwardly in the longitudinal direction of the vehicle body and is located along a central line of the vehicle body. A rear end of the propeller shaft 52 is connected to a rear-wheel final reduction and differential gear assembly 70 through a universal coupling device 523.

The rear-wheel final reduction and differential gear assembly 70 includes a rear bevel gear 71 which is connected to the propeller shaft 52 through the universal coupling device 523, a rear bevel pinion 72 which meshes with the rear bevel gear 71 and which is fixed to a rear differential case 721. A rear common pinion cross shaft 722 is fixed to the rear differential case 721 and a pair of rear differential bevel pinions 723 are rotatably mounted on the rear common pinion cross shaft 722. The rear differential bevel pinions 723 mesh with a pair of rear differential side bevel gears 724. The rear differential side bevel gears 724 serve as output members of the rear differential gear assembly 70 and are splined to serrated inner end portions of the rear shafts 73.

The rear shafts 73 are rotatably mounted on the rear differential case 721 and a rear differential housing 731 which encloses the rear bevel gear 71. The rear shafts 73 are operatively connected at their axial outer ends to rear wheel drives shafts 74 through constant-velocity coupling devices 741. The front wheel drive shafts 74 extend in a lateral direction of the vehicle body and are in turn connected at their outer axial ends to rear wheel axles for rear road wheels 75 through universal coupling devices 751. The front wheel drive shafts 74 extend in a lateral direction of the vehicle body and are in turn connected at their outer axial ends to rear wheel axles for rear road wheels 75 through universal coupling devices 751.

The operation of the four-wheel drive system according to the present invention is described hereunder. When the engine 10 is in operation and the clutch unit 20 is in a coupled condition, the driving force is transmitted from the output shaft 11 of the engine 10 to the input shaft 32 of the transmission gear unit 30 through the clutch unit 20. One of the driven gears 332 through 335 of the output shaft 33 is coupled to the output shaft 33 through the associated synchronizer clutch assembly 336 or 337, or the reverse idler gear 341 meshes with the reverse drive gear 326 and the synchronizer clutch assembly 336. The driving force is transmitted from the input shaft 32 to the output shaft 33 through the selected pair of gears which provide a selected gear ratio on the shafts 32 and 33 or through the gears 341 and 326. The output shaft 33 is, as a result, driven for rotation at a speed which is proportional according to the selected ratio to the rotational speed of the input shaft 32. The rotation of the output shaft 33 is transmitted through the transmission output gear 338, which is fixed to the output shaft 33, to the toothed wheel 62 of the central differential gear assembly 60, which is secred to the central differential gear case 61. The driving force is transmitted in turn from the toothed wheel 62 to the central bevel pinions 63 through the central differential gear case 61 and the central pinion cross shafts 631. The central bevel pinions 63 of the central differential gear assembly 60 are driven about the center axis of the front shafts 42 with the central differential gear case 61 and the central pinion cross shafts 631. Simultaneously, the central bevel pinions 63 are driven about the central pinion cross shafts 631. The central bevel pinions 63 in turn drive the central differential side bevel gears 632 and 633 about an axis at a right angle to the center axes of the central pinion cross shafts 631. The driving force is transmitted from the central bevel pinions 63 to the one of central side bevel gears 632 and is further transmitted to the front-wheel differential case 411 and the front wheel common pinion cross shaft 423 of the front-wheel differential gear unit 40. The front-wheel differential case 411 and the front wheel common pinion cross shaft 423 in turn drive the front-wheel differential bevel pinions 412. The front wheel differential bevel pinions 412 of the front wheel differential unit 40 are driven about the center axes of the front shafts 42 with the front wheel differential gear case 411 and the front wheel common pinion cross shaft 423. Simultaneously, the front wheel differential bevel pinions 412 are driven about the front wheel common pinion cross shaft 423. The front wheel differential bevel pinions 412 in turn drive the front wheel differential side bevel gears 413 about an axis at a right angle to the central axis of the common pinion cross shaft 423. The driving force is transmitted from the front-wheel differential bevel pinions 412 to the front wheel differential side bevel gear 413 and is further transmitted to the front shafts 42.

The driving force is also transmitted from the central bevel pinions 63 of the central differential gear assembly 60 to the second of central bevel gear 633 and is further transmitted to the hub member 64 and the ring gear 81. The rotation of the hub member 64 and the ring gear 81 is transmitted to the transmitting bevel gear 511 of the transmitting means 50. Accordingly, the driving force is transmitted from the central bevel gear 633 to the rear shafts 73 through the transmitting bevel gear 511, the propeller shaft 52 of the transmitting means 50 and the rear differential gear assembly 70.

In this condition, as shown in FIG. 3, when the annular coupling sleeve 91 of the engagement clutch assembly 90, which is slidably engaged with the external splines 635 being formed on the intermediate portion of the cylindrical boss portion 634 of the central side bevel gear 633, is uncoupled from the external serrated portion 613 of the central differential gear case 61, the central side bevel gear 633 and the central differential gear case 61 are permitted to rotate independently with respect to each other. As a result, the central side bevel gear 633 and the central differential gear case 61 can rotate at different speeds, so that the central side bevel gears 632 and 633 of the central differential gear assembly 60 can rotate at different speeds from each other with respect to the central differential gear case 61.

Accordingly, the driving force transmitted from the toothed wheel 62 to the front wheel differential case 411 of the front-wheel differential gear unit 40 through the first one of the central side bevel gears 632 can be different from the driving force transmitted from the toothed wheel 62 to the rear different gear assembly 70 through the second of the central side bevel gears 633, the ring gear 81 and the transmitting bevel gear 511.

As shown in FIG. 4, when the annular coupling sleeve 91 of the engagement clutch assembly 90 is coupled to the external serrated portion 613 of the central differential gear case 61, the second of the central side bevel gears 633 is rotatably engaged to the central differential gear case 61.

As a result, the second of the central side bevel gears 633 and the central differential gear case 61 rotate as a single unit so that the central side bevel gears 632 and 633 of the central differential gear assembly 60 are driven at equal speeds with respect the central differential case 61.

Accordingly, the driving force transmitted from the toothed wheel 62 to the front-wheel differential gear unit 40 is the same as the driving force transmitted from the toothed wheel 62 to the rear differential gear assembly 70.

Figure 5:
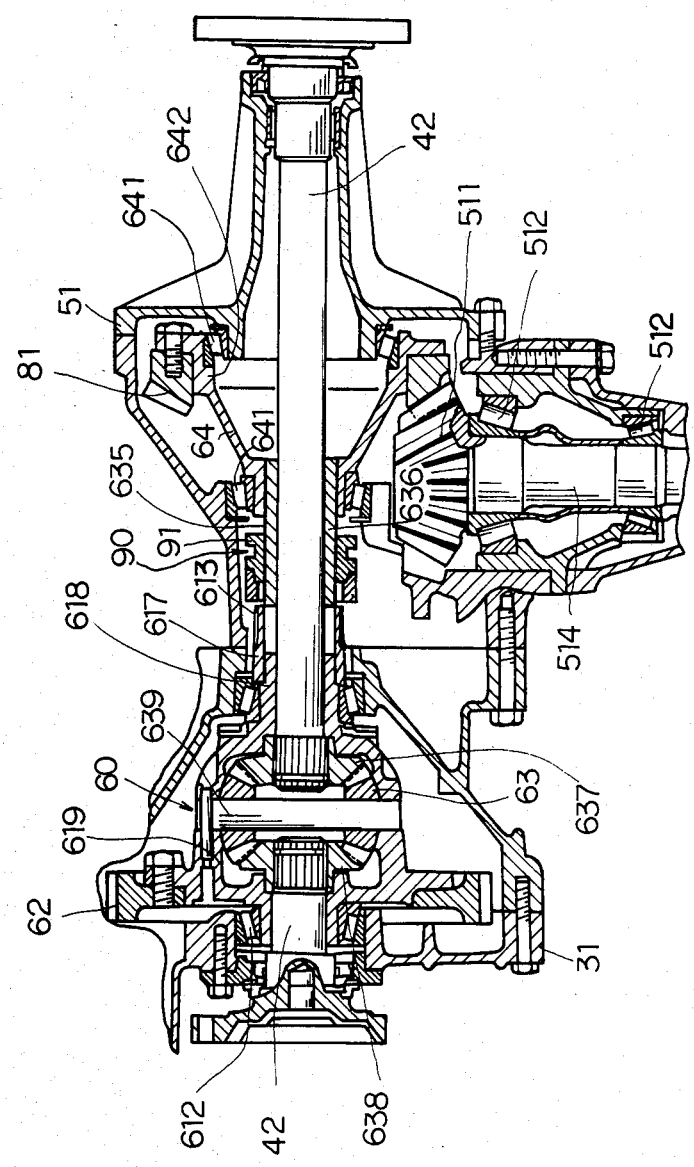
FIG. 5 is an enlarged sectional view of a variation of the transaxle mechanism shown in FIG. 4, wherein the transaxle mechanism is modified to be adapted to a vehicle having a two-wheel/four-wheel drive system, and wherein the annular coupling sleeve is uncoupled from the central differential case.
Figure 6:
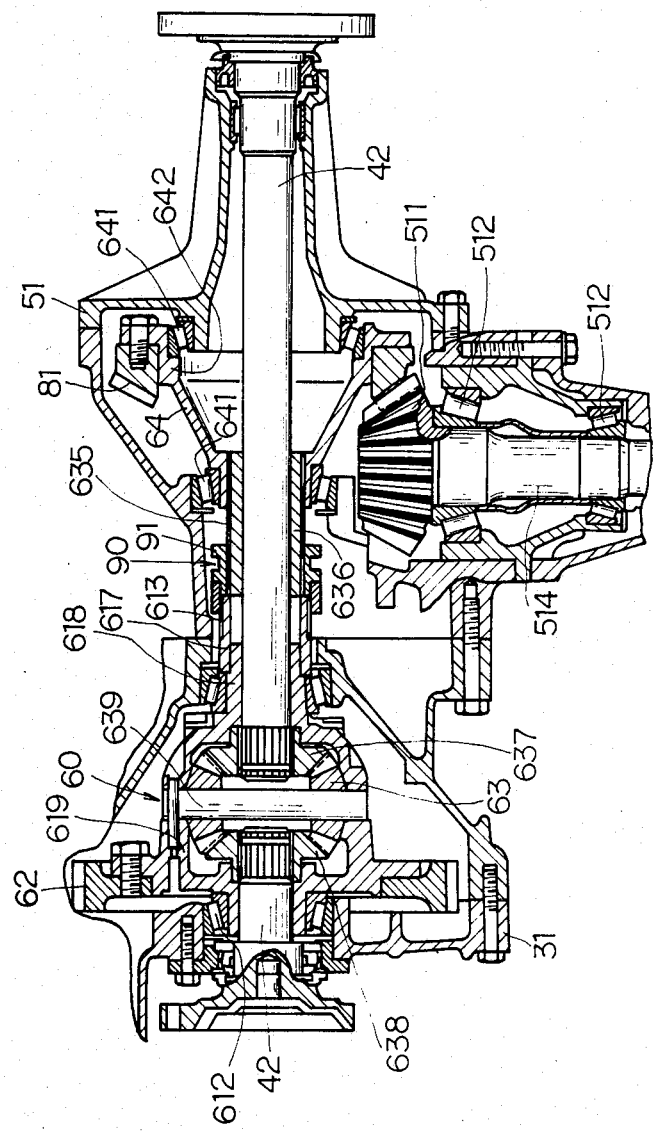
FIG. 6 is an enlarged sectional view of the variation of the transaxle mechanism shown in FIG. 5, wherein the annular coupling sleeve is coupled to the central differential case.

FIGS. 5 and 6 show a variation of the transaxle mechanism according to the present invention, wherein the transaxle mechanism is modified to be adapted to a vehicle having a two-wheel/four-wheel drive system.

A modified common pinion cross shaft 639 is adapted instead of the central pinion cross shafts 631, and modified differential side bevel gears 637 and 638 are adapted instead of the central differential side bevel gears 632 and 633. A modified central differential case 619 is adapted, which includes short cylindrical boss portions 618. The front shafts 42 are rotatably mounted on the respective short cylindrical boss portions 618 and the inner end serrated portions of the front shafts 42 are secured to the modified differential side bevel gears 637 and 638. The front wheel differential gear assembly 40 is removed from the modified central differential case 619. Further, a first hollow shaft 617 extending in the lateral direction of the vehicle is fixed to one of the short cylindrical boss portions 618 and the first hollow shaft 617 has an external serrated portion 613 thereon. A second hollow shaft 636 is fixed to the hub member 64 and extends to the first hollow shaft 617. The second hollow shaft 636 has external splines 635 thereon, on which the annular coupling sleeve 91 of the engagement clutch 90 is mounted slidably along the external splines 635.

As shown in FIG. 5, when the annular coupling sleeve 91 is uncoupled from the first hollow shaft 617 fixed to the modified central differential case 619, the driving force is not transmitted to the hub member 64 of the transmitting means 50, but the driving force is transmitted to the front shafts 42 through the modified central differential case 619, the modified common pinion cross shaft 639, the central differential bevel pinions 63 and the modified differential side bevel gears 637 and 638.

On the other hand, as shown in FIG. 6, when the annular coupling sleeve 91 is coupled to the first hollow shaft 617 fixed to the modified central differential case 619, the driving force is transmitted to the front shafts 42 through the modified central differential case 619, the modified common pinion cross shaft 639, the central differential bevel pinions 63 and the modified differential side bevel gears 637 and 638. Further, the driving force is transmitted to the rear shafts 73 through the modified central differential case 619, the first hollow shaft 617, the annular coupling sleeve 91, the second hollow shaft 636, the hub member 64, the ring gear 81, the transmitting bevel gear 511 and the rear differential gear assembly 70.

Accordingly, the annular coupling sleeve 91 serves as an exchange mechanism of a two-wheel/four-wheel drive system. Therefore, when the modified central differential case 619, the modified common pinion cross shaft 639, the modified differential side bevel gears 637 and 638 and the first and second hollow shafts 617 and 636 are applied to the transaxle mechanism according to the present invention instead of the central differential case 61, the central pinion cross shafts 631, the central differential side bevel gears 632 and 633 and the front wheel differential gear unit 40, the transaxle mechanism according to the present invention is used as a transaxle mechanism which is adapted to a vehicle having the two-wheel/four-wheel drive system.

Figure 7:
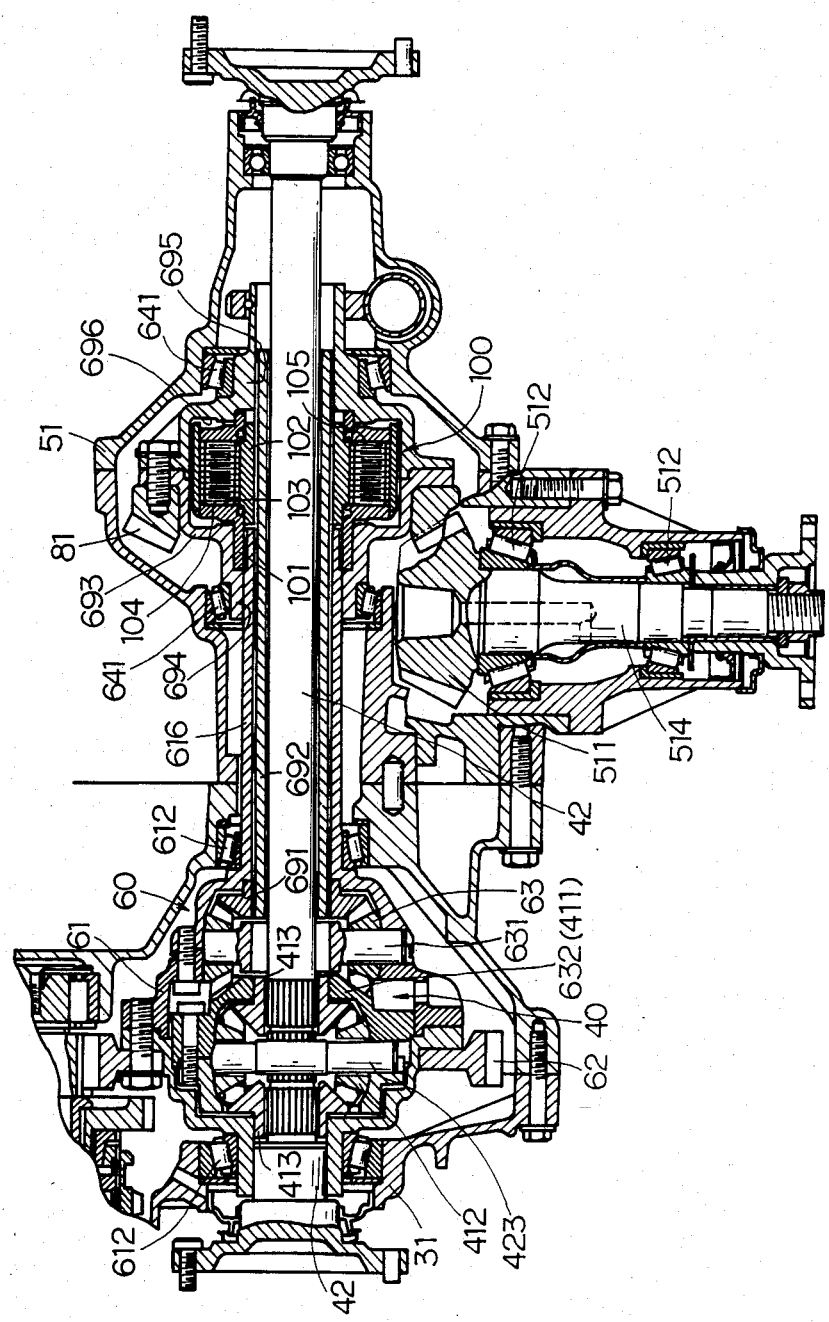
FIG. 7 is an enlarged sectional view of a front wheel drive gear unit and transmitting means of a transaxle mechanism of a four-wheel drive system of a second embodiment according to the present invention.

FIG. 7 shows a front wheel drive gear unit 40 and transmitting means 50 of a transaxle mechanism on a four wheel drive system of a second embodiment according to the present invention. This second embodiment is substantially similar to the first embodiment shown in FIGS. 3 and 4. Another of central side bevel gears 691 is secured to an inner end of a third hollow shaft 692 within which one of the front shafts 42 is rotatably inserted, and an outer end of the third hollow shaft 692 has an external serrated portion. The external serrated portion of the third hollow shaft 692 engages with an internal serrated portion of a mounting case 693. The mounting case is rotatably mounted on the auxiliary transaxle gear case 51 by the bearings 641 and has inner and outer hub portions 694 and 695. The internal serrated portion is formed on the outer hub portion 695 of the mounting case 693, and an internal expanded opening 696 is defined within the mounting case 693. Further, an interval is defined between the third hollow shaft 692 and the inner hub portions 694 of the mounting case 693 and an extended cylindrical portion 616 of the central differential case 61 is inserted into the interval defined between the third hollow shaft 692 and the inner hub portions 694. The ring gear 81 is secured to the mounting case 693.

A limiting differential mechanism 100 is located within the interval expanded opening 696 defined within the mounting case 693. The limiting differential mechanism 100 includes outer and inner cases 101 and 102. The outer case 101 of the limiting differential mechanism 100 is secured to and is rotatable with the extended cylindrical portion 616, and the outer case 101 defines an opening 103 therewithin. The inner case 102 of the limiting differential mechanism 100 faces the opening 103 defined within the outer case 101 of the limiting differential mechanism 100, and a plurality of seal means are located between the outer and inner cases 101 and 102. The inner case 102 of the limiting differential mechanism 100 has an internal serrated portion which is mounted on and is secured to an intermediate external serrated portion of the third hollow shaft 692. Accordingly, the inner case 102 is rotatable with the third hollow shaft 692 about the front shaft 42. Further, a plurality of outer plates 104, which extend from the outer case 101 to the inner case 102 are fixed to an inner peripheral surface of the outer case 101, and a space is defined between each two of the plurality of outer plates 104.

A plurality of inner plates 105, which extend from the inner case 102 to the outer case 101, each of which is inserted into the space defined between each two of the plurality of outer plates 104, are fixed to an outer peripheral surface of the inner case 102. The opening 103 defined between the outer and inner cases 101 and 102 is filled with silicone oil. Accordingly, when the inner plates 105 of the inner case 102 are moved within the silicone oil filled between two of the outer plates 104 of the outer case 101, the inner case 102 receives viscous resistance of the silicone oil.

Therefore, in this second embodiment of the present invention, when the central differential case 61 rotates at a speed different from the rotational speed of the second of central differential side bevel gears 691, which is higher than a predetermined speed, the rotational speed of the central differential case 61 is reduced and the rotational speed of the second of the central differential side bevel gears 691 is accelerated.

In operation of the second embodiment of the present invention, the driving force is transmitted from the toothed wheel 62 to the front shafts 42 through the central differential case 61, the central pinion cross shafts 631, the central differential pinions 63, the first of the central differential side gears 632, the front wheel pinion cross shaft 423, the front wheel differential pinions 412, the front wheel differential side gears 413, while the driving force is transmitted from the toothed wheel 62 to the rear shafts 73 through the central differential case 61, the central pinion cross shafts 631, the central differential pinions 63, the second of the central differential side gears 691, the third hollow shaft 692, the mounting case 693, the ring gear 81, the transmitting bevel gear 511, the propeller shaft 52 and the rear differential gear assembly 70.

When the difference in rotational speeds between the front shafts 42 and the rear shafts 73 is more than the predetermined amount, the limiting differential mechanism 100 reduces the difference of the rotational speeds and maintains the difference in the rotational speeds at the predetermined amount of speed.

Figure 8:
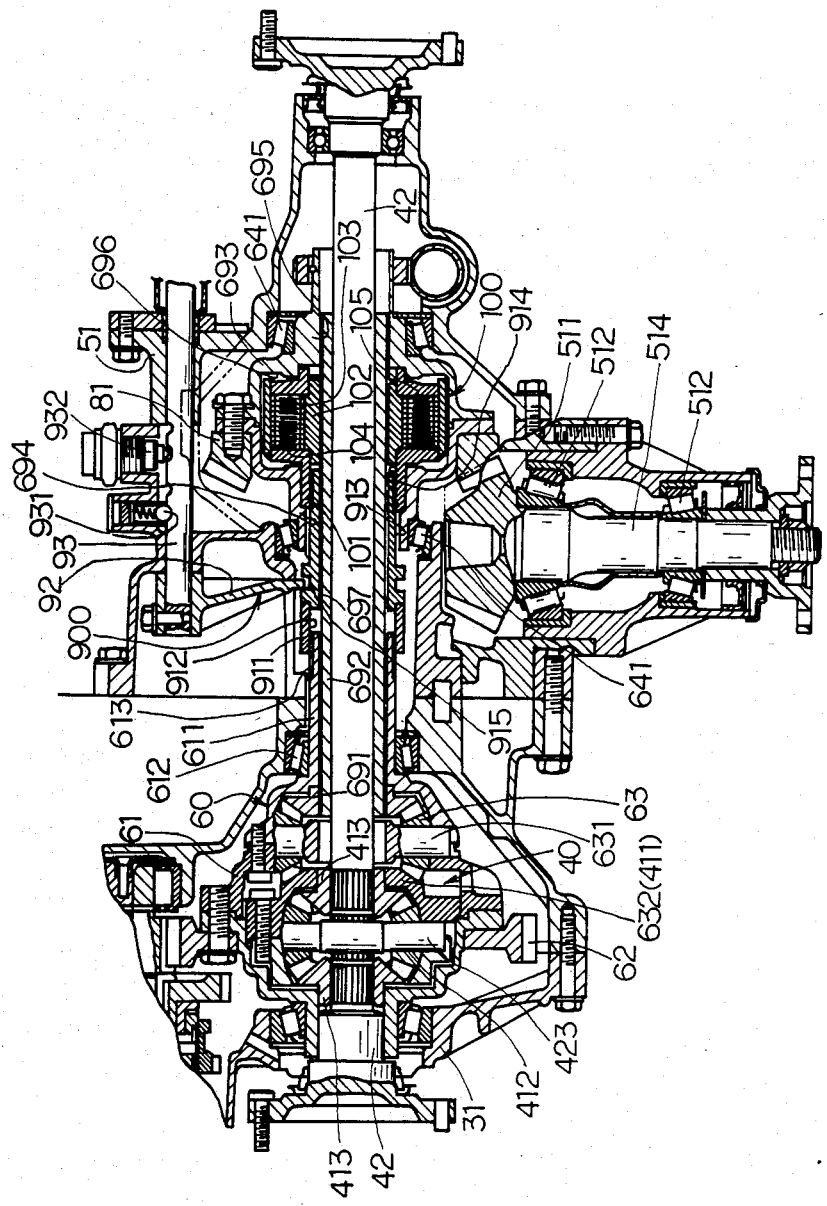
FIG. 8 is an enlarged sectional view of a front wheel drive unit and transmitting means of a transaxle mechanism of a four-wheel drive system of a third embodiment according to the present invention, wherein an annular coupling sleeve is coupled to a central differential case.
Figure 9:
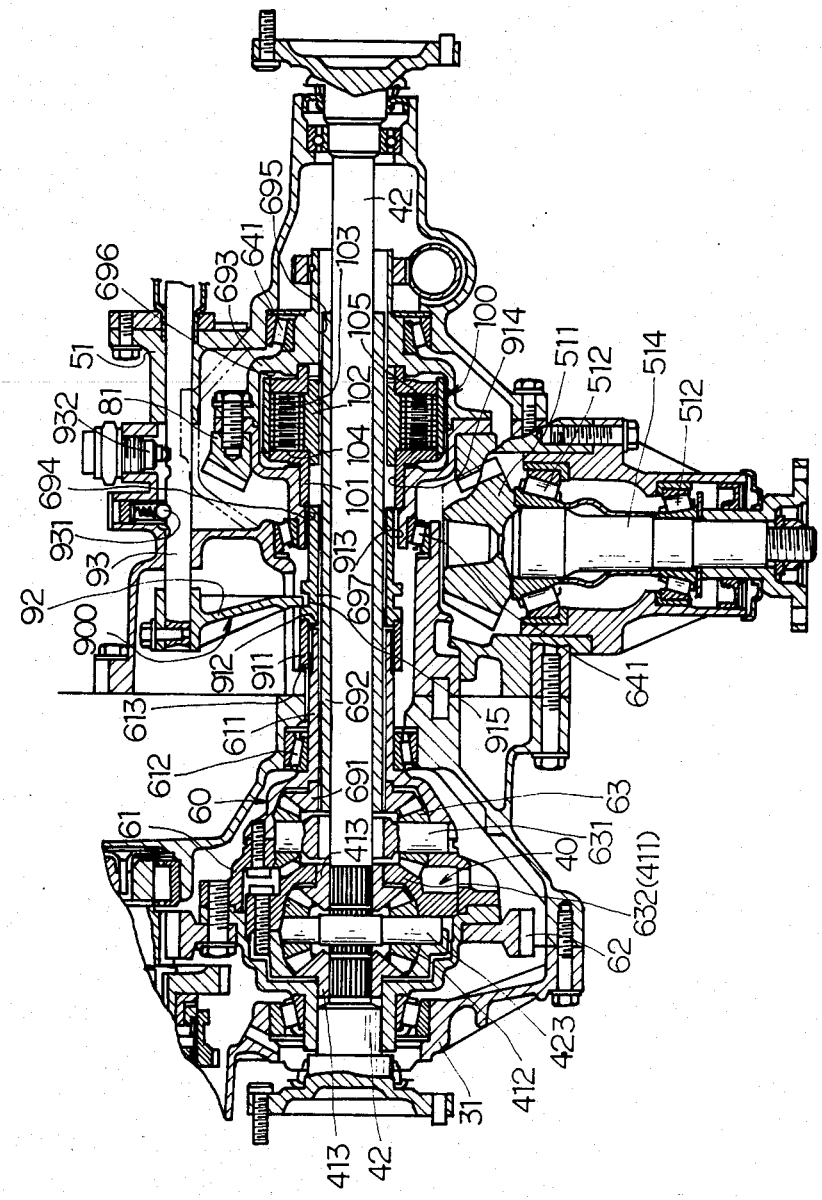
FIG. 9 is an enlarged sectional view of the front wheel drive unit and the transmitting means of the transaxle mechanism shown in FIG. 8, wherein the annular coupling sleeve is uncoupled from the central differential case.

FIGS. 8 and 9 show a front wheel drive gear unit 40 and transmitting means 50 of a transaxle mechanism on a four wheel drive system of a third embodiment according to the present invention. This third embodiment is similar to the second embodiment shown in Figure 7. A central differential case 61 includes a cylindrical boss portion 611 which is the same as the boss portion 611 of the first embodiment of the present invention, and which has an external serrated portion 613 thereon. The third hollow shaft 692, which is secured to the second of the central differential side bevel gear 691 and mounting case 693, includes external splines 697 on an intermediate portion thereof. An annular coupling sleeve 911 of the engagement control means 900 includes an innermost internal serrated portion 912 which engages with the external serrated portion 613 of the central differential case 61, an outermost external serrated portion 913 and an external circumferential groove 915, and the annular coupling sleeve 911 is mounted on and engages with the external splines 697 formed on the intermediate portion of the third hollow shaft 692, and it is slidably in the axial direction of the third hollow shaft 692. The limiting differential mechanism 100 includes an internal serrated portion 914 formed on the outer case 101 thereof, the outermost external serrated portion 913 of the annular coupling sleeve 911 engages selectively with the internal serrated portion 914 of the limiting differential mechanism 100.

Accordingly, as shown in FIG. 8, when the annular coupling sleeve 911 is coupled to the outer case 101 of the limiting differential mechanism 100, the driving force is transmitted from the central differential case 61 to the outer case 101 through the annular coupling sleeve 911. The outer case 101 is rotatable about the inner case 102 of the limiting differential mechanism 100, so that when the difference of the rotational speeds between the front shafts 42 and the rear shafts 73 is more than the predetermined amount of speed, the limiting differential mechanism 100 reduces the difference of the rotational speeds and maintains the difference of the rotational speeds at the predetermined amount of speed. As shown in FIG. 9, when the annular coupling sleeve 911 is uncoupled from the outer case 101 of the limiting differential mechanism 100, the driving force is not transmitted from the central differential case 61 to the outer case 101 and the annular coupling sleeve 911 is rotatable with the central differential case 611 about the third hollow shaft 692.

Accordingly, in this condition, even when the difference of the rotational speeds between the front shafts 42 and the rear shafts 73 is more than the predetermined amount of speed, the limiting differential mechanism 100 is not actuated so that the front shafts 42 and the rear shafts 73 rotate at different speeds.

A clutch actuating fork 92 of the engagement control means 900 is fitted into the external circumferential groove 915 of the annular coupling sleeve 911 and the clutch actuating fork 92 is secured to a control rod 93 of the engagement control means 900. The engagement control means 900 is mounted on the auxiliary case 51. The control rod 93 includes a plurality of recesses thereon and the engagement control means 900 further includes a positioning means 931 for positioning the control rod 93 at one of first and second positions. The positioning means 931 protrudes selectively into one of the plurality of recesses of the control rod 93 and positions the control rod 93 at one of the first and second positions. Further, the engagement control means 900 includes a locking screw 932 which is inserted selectively into one of the plurality of recesses of the control rod 93, and engages the control rod 93 at one of the first and second positions.

The operation of the third embodiment according to the present invention is the same as the second embodiment mentioned above. The operation of the limiting differential mechanism 100 of the third embodiment is selectively actuated or disactuated by the engagement control means 900. As shown in FIG. 8, when the control rod 93 of the engagement control means 900 is located in the first position, the annular coupling sleeve 911 is coupled to the outer case 101 and the limiting differential mechanism 100 is actuated. On the other hand, as shown in FIG. 9, when the control rod 93 of the engagement control means 900 is located in the second position, the annular coupling sleeve 911 is uncoupled from the outer case 101 and the limiting differential mechanism 100 is disactuated.

As described herein, the present invention overcomes the shortcomings of the known art by providing a four wheel drive system including a central differential, a front wheel differential enclosed within a central differential case of the central differential, a rear differential and transmitting means for transmitting driving force from the central differential to the rear differential.

While the present invention has been described in its preferred embodiments, it is to be understood that the invention is not limited thereto, and may be otherwise embodied within the scope of the hollowing claims.

What is claimed is:

1. A four-wheel drive system for use in a vehicle including a first and a second pair of road wheels, a power unit including an output shaft, and a power transmission gear unit including input and output shafts, the input shaft of the power transmission gear unit being selectively connected to the output shaft of the power unit, the output shaft of the power transmission gear unit selectively being in driving engagement with the input shaft of the power transmission gear unit, the four-wheel drive system comprising:

an engagement member being rotatable about a rotational axis located in a lateral direction of the vehicle, said engagement member being held in driving engagement with the output shaft of the power transmission gear unit;

a central differential gear assembly including a central input member fixed to and coaxially rotatable with said engagement member about the rotational axis of said engagement member and including a first central output member and a second central output member enclosed within the central input member, the first and second central output members being rotatable at different speeds about rotational axes substantially aligned with the rotational axis of said engagement member;

a first wheel differential gear assembly being enclosed within the central input member of said central differential gear assembly and including a first wheel input member being rotatable with the first central output member of said central differential gear assembly about the rotational axis of said engagement member and two first wheel output members, the two first-wheel output members being rotatable at different speeds about axes substantially aligned with the rotational axis of said engagement member, the two first-wheel output members being held in driving engagement with the first wheel input member;

a second wheel differential gear assembly including a second wheel input member and two second wheel output members being rotatable at different speeds about rotational axes which are substantially parallel to the rotational axis of said engagement member, the two second wheel output members being held in driving engagement with the second wheel input member; and transmitting means for transmitting drive force from said central differential gear assembly to said second wheel differential gear assembly including a transmitting input member and a transmitting output member, said transmitting input member being held rotatable with the second central output member of said central differential gear assembly about the rotational axis of said engagement member and being located at substantially a central point of the vehicle in the lateral direction of the vehicle, said transmitting output member having a longitudinal axis, along substantially a central longitudinal line of the vehicle and being connected to said second wheel input member of said second wheel differential assembly, said transmitting means further including a right-angle power transfer gear means for changing the rotational direction from about the lateral axis of the transmitting input member to about the longitudinal axis of the transmitting output member, the right-angle power transfer gear means being connected to said transmitting input member and said transmitting output member.

2. The four-wheel drive system of claim 1, wherein said central differential gear assembly further comprises a central cross shaft being fixed to the central input member and two central intermediate members being mounted rotatably on the central cross shaft and meshing with the first and second central output members.

3. The four-wheel drive system of claim 1, wherein said central differential gear assembly further comprises a coupling element intervening between the central input member and the second central output member of said central differential gear assembly, said coupling element selectively engaging said central input member to said second central output member, whereby when the coupling element engages the central input member to said second central output member, the central input member and the second central output member rotate at equal speeds about the rotational axis of said engagement member, and whereby when the coupling element does not engage the central input member to the second central output member, the central input member and the second central output member rotate at different speeds about the rotational axis of said engagement member.

4. The four-wheel drive system of claim 3, wherein the central input member of said central differential gear assembly includes a first cylindrical portion, the second central output member of said central differential gear assembly includes a second cylindrical portion, an inner part of the second cylindrical portion being rotatably mounted on an inner peripheral surface of the first cylindrical portion of the central input member, and intermediate and outer parts of the second cylindrical portion being out of the first cylindrical portion of said input member, and the coupling element being mounted slidably on the intermediate part of the second central output member.

5. A four-wheel drive system of claim 4, wherein the central input member includes a first external engagement device on the first cylindrical portion thereof, the second central output member includes a second external engagement device on the intermediate portion thereof, and the coupling element includes first and second internal engagement devices, one of the first and second internal engagement devices of the coupling element selectively engaging with a corresponding one of said first and second external engagement devices, another of the first and second internal engagement devices of the coupling element engaging with another corresponding one of said first and second external engagement devices.

6. The four-wheel drive system of claim 1, wherein the first wheel input member of said first wheel differential gear assembly is formed integrally with the first central output member of said central differential gear assembly.

7. A four-wheel drive system of claim 6, wherein said first wheel differential gear assembly further comprises a first wheel cross shaft being fixed to the first wheel input member and two first wheel intermediate members being mounted rotatably on the first wheel cross shaft and meshing with the two first wheel output members.

8. The four-wheel drive system of claim 7, wherein the two first wheel output members are enclosed within the central input member and a part of each of the two first wheel output members is enclosed within the first wheel input member which is enclosed within the central input member, whereby the first wheel input member and a part of the central input member cover the two first wheel output members.

9. The four-wheel drive system of claim 1, wherein the transmitting input member of said transmitting means is secured to the second central output member of said central differential gear assembly and the transmitting input member includes an internal opening therein.

10. A four-wheel drive system of claim 9, further comprising a limiting differential means comprising a first limiting member and a second limiting member and a viscous material being filled between said first limiting member and said second limiting member, said limiting differential means being located within the internal opening of the transmitting input member, the first limiting member of said limiting differential means being connected to the central input member of said central differential gear assembly, the second limiting member of said limiting differential means being secured to the second central output member of said central differential gear assembly.

11. A four-wheel drive system of claim 10, further comprising a main case which encloses said engagement member and said central and first wheel differential gear assemblies and an auxiliary case which encloses the transmitting input member and the right-angle power transfer gear means of said transmitting means and said limiting differential means.

12. A four-wheel drive system of claim 11, further comprising an engagement control means being mounted on said auxiliary case and including a coupling element intervening between the first limiting member of said limiting differential means and the central input member of said central differential gear assembly, said coupling element functioning to selectively engage said first limiting member to said central input member, whereby when the coupling element engages the first limiting member to the central input member, the central input member rotates with said first limiting member of said limiting differential means so that said limiting differential means is actuated, and whereby when the coupling element does not engage the first limiting member to the central input member, the central input member and the first limiting member rotate at different speeds so that said limiting differential means is not actuated.

13. A four-wheel drive system for use in a vehicle comprising a first and second pairs of road wheels, a power unit including an output shaft rotatable about a lateral axis of the vehicle, and a power transmission gear unit including transmission input and output shafts each of which is rotatable about a lateral axis of the vehicle, the transmission input shaft being selectively connected to the output shaft of the power unit, the four-wheel drive system comprising:
  an engagement member which is rotatable about an axis which is parallel to the rotational axes of the transmission input and output shafts, said engagement member being held in driving engagement with the transmission output shaft;
  a central differential gear assembly including a central differential case being coaxially rotatable with said engagement member about said rotational axis of said engagement member and two central output members being enclosed within the central differential case, the two central output members being rotatable at different speeds about axes which are in substantial alignment with the rotational axis of said engagement member;
  a first wheel drive gear assembly including a first wheel input member being rotatable with one of the two central output members of said central differential gear assembly about said rotational axis of said engagement member, the first wheel input member of said first wheel drive gear assembly being formed integrally with said one of two central output members of said central differential gear assembly, said first wheel drive gear assembly being enclosed within the central differential case, said first wheel drive gear assembly including two first wheel output members, the two first-wheel output members being rotatable at different speeds about the rotational axis of said engagement member, each of said two first-wheel output members being connected to one of said first pair of road wheels;
  a second wheel drive gear assembly including a second wheel input member and two second wheel output members which are rotatable at different speeds about a rotational axis which is substantially parallel to the rotational axis of the central differential case and each of said two second wheel output members being connected to one of the second pair of road wheels; and
  transmitting means for transmitting driving force from said central differential gear assembly to said second wheel drive gear assembly, said transmitting means including a transmitting input member and a transmitting output member, said transmitting input member being rotatable with another of said two central output members of said central differential gear assembly about the rotational axis of said engagement member and being located at a substantially central point of the lateral direction of the vehicle, the transmitting input member of said transmitting means being secured to the another of said two central output members of said central differential gear assembly and including an internal opening therein, said transmitting output member having a longitudinal axis along a substantially central longitudinal line of the vehicle and being connected to said second wheel input member of said second wheel drive gear assembly, right-angle power transfer gear means changing for changing the rotational direction from about the lateral axis of the transmitting input member to about the longitudinal axis of the transmitting output member, the right-angle power transfer gear means being connected to the transmitting input member and said transmitting output member.

14. A four-wheel drive system of claim 13, further comprising a limiting differential means comprising a first limiting member and a second limiting member and a viscous material being filled between the first limiting member and the second limiting member, said limiting differential means being located within the internal opening of the transmitting input member, the first limiting member of said limiting differential means being connected to the central input member of said central differential gear assembly, the second limiting member of said limiting differential means being secured to the second of said two central output members of said central differential gear assembly.

15. A four-wheel drive system of claim 14, further comprising a main case enclosing said engagement member and said central and first wheel differential gear assemblies and an auxiliary case enclosing the transmitting input member and the right-angle power transfer gear means of said transmitting means and said limiting differential means.

16. A four-wheel drive system of claim 15, further comprising an engagement control means being mounted on the auxiliary case and including a coupling element selectively engaging intervening between the first limiting member of said limiting differential means and the central input member of said central differential gear assembly, the coupling element selectively engaging the first member to the central input member, whereby when the coupling element engages said first limiting member to the central input member, the central input member rotates with the first limiting member of said limiting differential means so that said limiting differential means is actuated, and whereby when the coupling element does not connect the first limiting member to the central input member, the central input member and the first limiting member rotate at different speeds so that said limiting differential means is not actuated.

17. A four-wheel drive system for use in a vehicle including first and second pairs of road wheels, a power unit including an output shaft being rotatable about a lateral axis of the vehicle, and a power transmission gear unit including input and output shafts each of which is rotatable about a lateral axis of the vehicle, the input shaft of the power transmission gear unit being selectively connected to the output shaft of the power unit, the output shaft of the power transmission gear unit being selectively held in driving engagement with the input shaft of the power transmission gear unit, the four-wheel drive system comprising:

an engagement member being rotatable about a rotational axis which is parallel to the rotational axes of the transmission input and output shafts, said engagement member being held in driving engagement with the output shaft of the power transmission gear unit;

a central differential gear assembly including a central differential case being fixed to and coaxially rotatable with said engagement member about the rotational axis of said engagement member and first and second central output members being enclosed within the central differential case, the first and second central output members being rotatable at different speeds about axes substantially aligned with the rotational axis of said engagement member, the second central output member having a cylindrical portion which extends opposite to the first central output member, the cylindrical portion including an internal opening therein;

a first wheel differential gear assembly being enclosed within the central differential case of said central differential gear assembly and including a first wheel differential case being rotatable with the first central output member of said central differential gear assembly about said rotational axis of said engagement member and two first wheel output members, said first wheel differential member being formed integrally with the first central output member of said central differential gear assembly, said two first-wheel output members being rotatable at different speeds from each other about axes substantially aligned with the rotational axis of said engagement member and each of the two first-wheel output members being connected to one of the first pair of road wheels, each of the two first-wheel output members being held in driving engagement with the first wheel differential case;

a second wheel differential gear assembly including a second wheel input member and two second wheel output members which are rotatable at different speeds about rotational axes which are substantially parallel to the rotational axis of said engagement member, the two second wheel output members being held in driving engagement with the second wheel input member and each of the two second wheel output members being connected to one of the second pair of road wheels; and transmitting means for transmitting drive force from said central differential gear assembly to said second wheel differential gear assembly including a transmitting input member and a transmitting output member, said transmitting input member being secured to the cylindrical portion of the second central output member of said central differential gear assembly about the rotational axis of said engagement member and being located at substantially a central point of the lateral direction of the vehicle, said transmitting output member having a longitudinal axis along substantially a central longitudinal line of the vehicle and being connected to the second wheel input member of said second wheel differential assembly, right-angle power transfer gear means for changing the rotational direction from about the lateral axis of the transmitting input member to about the longitudinal axis of the transmitting output member, the right-angle power transfer gear means being connected to said transmitting input member and said transmitting output member.

18. A four-wheel drive system of claim 17, wherein said central differential gear assembly further comprises a coupling element intervening between the central differential case and the second central output member of said central differential gear assembly and the coupling element selectively engages said central differential case to the second central output member, whereby when the coupling element engages the central differential case to the second central output member, the central differential case and the second central output member rotate at equal speeds about the rotational axis of said engagement member and whereby when the coupling element does not engage the central differential case to the second central output member the central differential case to the second central output member rotate at different speeds about the rotational axis of said engagement member.

19. A four-wheel drive system of claim 17, further comprising a limiting said differential means for limiting said difference in rotational speed between said first wheel output member and said second wheel output member, said limiting differential means including a viscous material being filled between said first wheel output member and said second wheel output member, said limiting differential means being located within the internal opening of the cylindrical portion of the second central output member, the first member of said limiting differential means being connected to the central differential case of said central differential gear assembly, the second member of said limiting differential means being secured to the second central output member of said central differential gear assembly.

20. A four-wheel drive system of claim 19, further comprising a main case enclosing said engagement member and said central and first wheel differential gear assemblies and an auxiliary case enclosing the transmitting input member and the right-angle power transfer gear means of said transmitting means and said limiting differential means.

21. A four-wheel drive system of claim 20, further comprising an engagement control means being mounted on the auxiliary case and including a coupling element intervening between the first member of said limiting differential means and the central differential case of said central differential gear assembly, the coupling element selectively engaging the first member to the central differential case, whereby when the coupling element engages the first member to the central differential case, the central differential case rotates with the first member of said limiting differential means so that said limiting differential means is actuated, and whereby when the coupling element engages the first member to the central differential case, the central differential case and the first member rotate at different speed so that said limiting differential means is not actuated.

* * * * *